(12) United States Patent
Kshirsagar et al.

(10) Patent No.: US 8,095,786 B1
(45) Date of Patent: Jan. 10, 2012

(54) APPLICATION-SPECIFIC NETWORK-LAYER VIRTUAL PRIVATE NETWORK CONNECTIONS

(75) Inventors: Shekhar Kshirsagar, San Jose, CA (US); Christopher N. Thomas, Watsonville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1401 days.

(21) Appl. No.: 11/558,293

(22) Filed: Nov. 9, 2006

(51) Int. Cl.
*H04L 29/06* (2006.01)
*G06F 9/00* (2006.01)

(52) U.S. Cl. ............................ 713/152; 713/151; 726/15

(58) Field of Classification Search .................... 726/15; 713/151, 152
See application file for complete search history.

(56) References Cited

U.S. PATENT DOCUMENTS

| | | | |
|---|---|---|---|
| 6,694,434 B1 * | 2/2004 | McGee et al. ................. | 713/189 |
| 7,058,973 B1 * | 6/2006 | Sultan .............................. | 726/12 |
| 2003/0050051 A1 * | 3/2003 | Vilander ....................... | 455/414 |
| 2003/0131245 A1 * | 7/2003 | Linderman ................... | 713/176 |
| 2004/0213410 A1 * | 10/2004 | Gupta et al. .................. | 380/270 |
| 2005/0021789 A1 * | 1/2005 | Iloglu et al. ................... | 709/229 |
| 2006/0005240 A1 * | 1/2006 | Sundarrajan et al. ........... | 726/15 |
| 2006/0245414 A1 * | 11/2006 | Susai et al. ..................... | 370/352 |
| 2006/0253605 A1 * | 11/2006 | Sundarrajan et al. ......... | 709/238 |

OTHER PUBLICATIONS

Solomon et al, "Microsoft® Windows® Internals, Fourth Edition: Microsoft Windows Server™ 2003, Windows XP, and Windows 2000", Dec. 8, 2004, Microsoft Press, pp. 692-694; Included in previous action.*

Bollapragada et al, "IPSec VPN Design", Apr. 2005, Cisco Press, pp. 4-6 and 12-15; Included in previous action.*

Solomon et al, "Microsoft® Windows® Internals, Fourth Edition: Microsoft Windows Server TM 2003, Windows XP, and Windows 2000", Dec. 8, 2004, Microsoft Press, pp. 692-694; Included in previous action.*

Zhang et al, "HACC: an architecture for cluster-based web servers" from "Proceedings of the 3rd USENIX Windows NT Symposium" Jul. 12-13, 1999, USENIX Association, p. 4; Included in previous action.*

* cited by examiner

*Primary Examiner* — Kambiz Zand
*Assistant Examiner* — Michael Guirguis
(74) *Attorney, Agent, or Firm* — Shumaker & Seiffert, P.A.

(57) ABSTRACT

Techniques are described for providing secure communication of network traffic from specific applications operating on a client device to a server device using a network-layer virtual private network (VPN). For example, a module on a client device may intercept network traffic from an application executing on the client device. The module may then determine whether to send the application-layer data through a network-layer VPN tunnel from the client device to a gateway device. This network-layer VPN tunnel may be defined by a network address of a physical adapter of the client device and a network address of the VPN gateway. In other words, there may be no need for the interposition of a VPN proxy on the client device. The module makes this determination on an application-by-application basis. The client device then forwards the application-layer data through the VPN tunnel based on the determination.

26 Claims, 3 Drawing Sheets

APPLICATION-SPECIFIC NETWORK-LAYER VIRTUAL PRIVATE NETWORK CONNECTIONS

TECHNICAL FIELD

The invention relates to computer networks, and particularly to virtual private networks.

BACKGROUND

Enterprises may use virtual private networks (VPN) to allow employees to securely communicate with servers at an enterprise location. For example, an enterprise may provide a VPN gateway that is coupled to a protected network. An employee using a client device at a remote location may establish a VPN connection to the VPN gateway through the Internet. Subsequently, the VPN gateway forwards network traffic flowing through the VPN connection to servers on the protected network. In this way, the employee may communicate with servers on the protected network. In some circumstances, it may be advantageous for only certain applications to communicate through the VPN tunnel. For instance, limiting use of the VPN tunnel to certain applications may reduce the processing burden on a VPN gateway.

Various implementations of application-specific VPN connections may use different layers of the Open Systems Interconnect (OSI) reference model. The Open System Interconnect (OSI) reference model describes a seven layer model. These layers are the physical layer (Layer 1), the data link layer (Layer 2), the network layer (Layer 3), the transport layer (Layer 4), the session layer (Layer 5), the presentation layer (Layer 6), and the application layer (Layer 7).

In one transport-layer VPN implementation, i.e., a Layer 4 VPN, a VPN administrator provides applications executing on a client device with "loop-back" addresses. When one of the applications attempts to send a message addressed to a "loop-back" address, the message is processed through the full network stack on the client device. However, the message does not leave the client device. Rather, the message is delivered to a proxy on the client device. The proxy maintains a Secure Sockets Layer (SSL) connection with a VPN gateway using a private Internet Protocol (IP) assigned to the proxy by the VPN gateway. The proxy may send the message to the VPN gateway via the SSL connection as though the proxy originated the message. The VPN gateway also acts as a proxy. That is, the VPN gateway operates for a termination point for the SSL connection, processes the message through its network stack and forwards the message through a different session as through the VPN gateway originated the message.

In one network-layer VPN implementation (i.e., a Layer 3 VPN), a network administrator installs a VPN client on a client device. The VPN client maintains a network-layer VPN connection with a VPN gateway. The VPN client acts as a virtual adapter with its own assigned network address. When the virtual adapter receives an IP packet, the virtual adapter encapsulates the IP packet in a secure network-layer tunneling protocol such as an Internet Protocol Security (IPsec) protocol. The virtual adapter then forwards the IPsec protocol packet to a VPN gateway. When the VPN gateway receives the IPsec packet, the VPN gateway removes the IPsec protocol encapsulation and forwards the original IP packet to a destination server on the protected network. To ensure that IP packets addressed to destination servers reach the virtual adapter, a network administrator modifies a route table in the client device to direct IP packets addressed to specific destination servers through the virtual adapter. For example, if 128.0.0.1 is the IP address of an email server on a protected network, a network administrator may add an entry to a route table on the client device to force the client device to route IP packets addressed to 128.0.0.1 through the virtual adapter. In this way, the network administrator may select the servers to which the client device sends network traffic via the VPN connection.

SUMMARY

In general, the invention is directed to the secure communication of network traffic from specific applications operating on a client device to a server device using a network-layer virtual private network (i.e., a Layer 3 VPN). A module on a client device intercepts application-level network traffic from applications executing on the client device as the network traffic is delivered to the operating system. Based on the application that originated the traffic, the module determines whether to send the network traffic through a network-layer VPN tunnel from the client device to a gateway device or to output the traffic as clear text, i.e., unsecured. Thus, the module makes this determination on an application-by-application basis. In a network-layer VPN tunnel, network-layer packets are encapsulated within packets conforming to a network-layer tunneling protocol. This network-layer VPN tunnel may be defined by a network address of a physical adapter of the client device and a network address of the VPN gateway. The client device forwards the network traffic through the VPN tunnel based on the determination. As a Layer 3 VPN, the techniques provide application-specific security while potentially avoiding the need for the interposition of a VPN proxy on the client device, as is often required by higher-level VPNs.

For example, when a user invokes a VPN client on a client device to establish a VPN connection to a VPN gateway, the VPN client may configure an application traffic identifier (ATI) subsystem in an operating system of the client device. The ATI subsystem intercepts requests to the operating system from applications executing on the client device to establish transport-layer connections. If the ATI subsystem determines that the application that sent the request has been designated for secure communication, the ATI subsystem provides network-layer VPN software on the client device with information regarding the transport-layer connection. For instance, ATI subsystem may provide an IP address and a TCP port number of a transport-layer connection to the VPN software. Subsequently, the network-layer VPN software may receive a request from a transport-layer protocol module on the client device to send information through a transport-layer connection using network-layer services. If the transport-layer connection of the request corresponds to the transport-layer connection information provided by the ATI subsystem, the VPN software sends the information through the network-layer VPN connection to a VPN gateway for eventual delivery to a destination server.

In one embodiment, a method comprises establishing a network-layer (Layer 3) virtual private network (VPN) tunnel from a client device to a gateway device. The network-layer VPN tunnel is defined by a network address of an adapter of the client device and a network address of the gateway device. The method also comprises receiving, with a module on a client device, application-layer data to be sent to a server device from an application executing on the client device. In addition, the method comprises determining, on an application-by-application basis based on the application from which the request was received, whether to send the application-layer data through the network-layer VPN tunnel. The method also comprises sending, with the client device, the application-layer data through the network-layer VPN tunnel based on the determination.

In another embodiment, a network device comprises a VPN manager to establish a network-layer VPN tunnel from the network device to a gateway device. The network-layer VPN tunnel is defined by a network address of an adapter of the network device and a network address of the gateway device. The network device also includes an Application Traffic Identifier (ATI) subsystem to intercept application-layer data to be sent to a server device from an application executing on the network device. The ATI subsystem determines on an application-by-application basis whether to send the application-layer data through the network-layer VPN tunnel. In addition, the network device includes a Layer 3 VPN subsystem responsive to the ATI subsystem, wherein the Layer 3 VPN subsystem sends the application-layer data through the network-layer VPN tunnel based on the determination.

In another embodiment, a computer-readable medium comprises instructions. The instructions cause a programmable processor of a client device to establish a network-layer virtual private network (VPN) tunnel from the client device to a gateway device. In this embodiment the network-layer VPN tunnel is defined by a network address of an adapter of the client device and a network address of the gateway device. The instructions also cause the processor to receive, with a module on the client device, network traffic to a server device from an application executing on the client device. In addition, the instructions cause the processor to determine, with the module, whether to send the application-layer data through the network-layer VPN tunnel on an application-by-application basis. The instructions also cause the processor to send the application-layer data through the network-layer VPN tunnel based on the determination.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
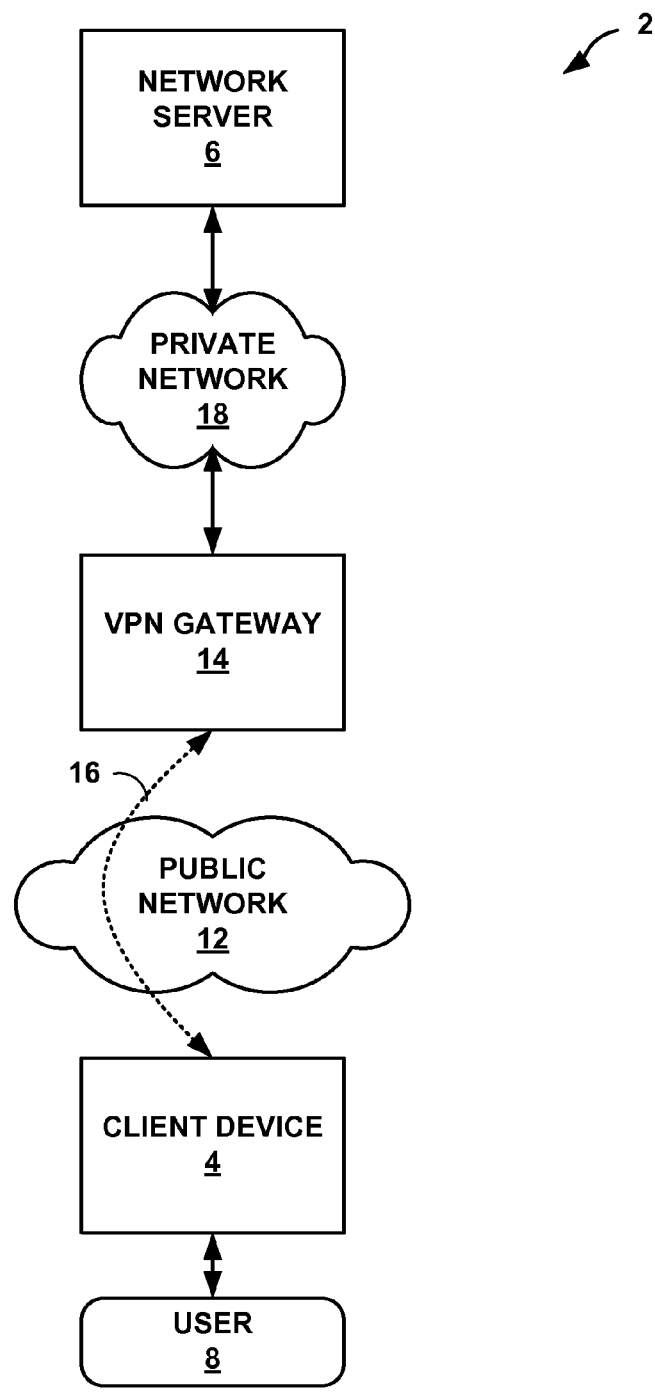
FIG. 1 is a block diagram illustrating an exemplary system in which a client device uses an application-specific network-layer Virtual Private Network (VPN) to communicate with a network server.

FIG. 1 is a block diagram illustrating an exemplary system 2 in which a client device 4 uses an application-specific network-layer Virtual Private Network (VPN) connection to communicate with a network server 6. Client device 4 may be a personal computer, a network server, a gaming platform, a personal digital assistant, a network telephone, a television set-top box, a network television, a mobile telephone, an intermediate network device, or otherwise. Server 6 may one of a variety of network server including Microsoft Exchange servers, email servers, web servers, file transfers protocol servers, Voice over Internet Protocol (VoIP) servers, and so on.

To communicate with network server 6, a user 8 of client device 4 may cause client device 4 to initiate a network-layer VPN connection 16 over a public network 12 with a VPN gateway 14. Public network 12 may be a wide-area network, such as the Internet. Network-layer VPN connection 16 may represent a stream of Internet Protocol (IP) packets on public network 12 that securely encapsulate network-layer packets. For example, client device 4 and VPN gateway 14 may send streams of network-layer packets conforming to an Internet Protocol Security (IPSec) protocol, such as Authentication Header (AH) or Encapsulating Security Protocol (ESP). In addition, VPN connection 16 may also be a Secure Sockets Layer (SSL) connection.

When user 8 causes client device 4 to initiate VPN connection 16, client device 4 may authenticate itself to VPN gateway 14 and VPN gateway 14 may authenticate itself to client device 4. For example, client device 4 and VPN gateway 14 may exchange public key certificates issued by a mutually-trusted third party. Client device 4 and VPN gateway 14 may also negotiate other aspects to ensure the security of VPN connection 16, such as an encryption algorithm.

Applications executing on client device 4 may generate application-layer data for transmission on network 12. The applications may then request that client device 4 send the application-layer data using a transport-layer protocol, such as Transmission Control Protocol (TCP). When the applications make such requests to send application-layer data, client device 4 determines whether or not to the send the application-layer data through VPN connection 16. Client device 4 determines whether or not to send the application-layer data through VPN connection 16 on an application-by-application basis. For example, client device 4 may send application-layer data from Microsoft Outlook through VPN connection 16 and may send application-layer data from Microsoft Internet Explorer through an unsecured path through public network 12.

To determine whether or not to send network traffic from applications through VPN connection 16, client device 4 may receive application security information from VPN gateway 14. The application security information may specify that client device 4 should route network traffic from certain applications executing on client device 4 through VPN connection 16. An application traffic identifier (ATI) subsystem on client device 4 may be in installed within an operating system of the client device so as to intercept requests from the applications to perform transport-layer services. If the ATI subsystem determines that the application requesting the transport-layer services is one of the applications specified in the application security information, the ATI subsystem provides a destination address of the application-protocol data and a port number to a VPN subsystem on client device 4. Subsequently, the VPN subsystem may receive a request to send transport-layer segments (e.g., TCP segments) generated from application data to a destination address on public network 12. If ATI subsystem has provided the VPN subsystem with a destination address and a port number that corresponds to the destination address and port number of the transport-layer segment, the VPN subsystem sends a network-layer packet that encapsulates the transport-layer segment through VPN connection 16. For example, the VPN subsystem may encapsulate a TCP segment into an IP packet and then encapsulate the IP packet into an Internet Protocol Security (IPsec) packet such as an Encapsulating Security Protocol (ESP) packet.

When VPN gateway 14 receives an IPsec packet from client device 4 via VPN connection 16, VPN gateway 14 may decapsulate the IPsec packet to obtain an IP packet. VPN gateway 14 may then perform a network address translation (NAT) on a destination address of IP packet to derive an IP address of network server 6. VPN gateway 14 may then forward the IP packet through a private network 18 to network server 6. VPN gateway 14 need not perform a network address translation on the source network address of the IP packet. For this reason, network server 6 may receive an IP address of client device 4 that is routable in private network 18. Consequently, network server 6 may use the IP address of client device 4 to initiate sessions through VPN connection 16 with client device 4.

The invention may provide one or more advantages. For example, an administrator may easily specify which applications should communicate using a VPN tunnel by configuring a single application security information file. As another example, the invention may support application-specific support for applications such as FTP, VoIP, and Session Initiation Protocol ("SIP") that use server-initiated connections. Moreover, the invention may avoid the use of a proxy on the client device and eliminate the need for an administrator to update a route table on the client device as may be required some network-layer (Layer 4) VPN implementations.

Figure 2:
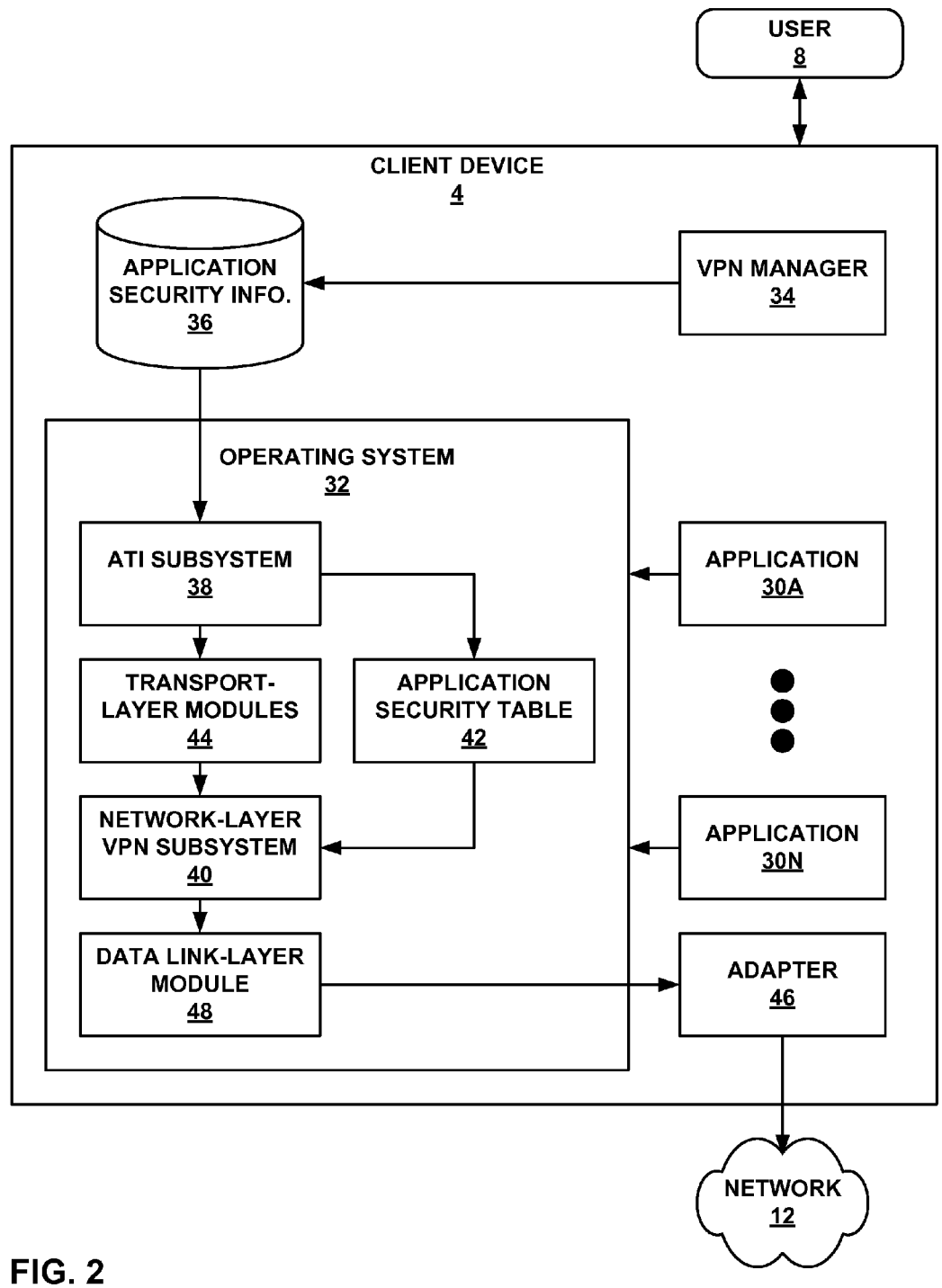
FIG. 2 is a block diagram illustrating an exemplary client device that may contain one or more embodiments of the invention.

FIG. 2 is a block diagram illustrating an exemplary client device that may contain one or more embodiments of the invention. As illustrated in the example of FIG. 2, client device 4 includes applications 30A through 30N (collectively, applications 30). Applications 30 may include a wide variety of software applications executing on client device 4. For example, applications 30 may include web browsers, email clients, FTP clients, games, word processors, database clients, point-of-sale software, and so on.

When user 8 wishes to communicate with network server 6 on private network 18, user 8 may command an operating system 32 of client device 4 to launch a VPN manager 34. When operating system 32 launches VPN manager 34, VPN manager 34 may prompt user 8 for authentication credentials. For example, VPN manager 34 may prompt user 8 to enter a username and password, a biometric, a one-time password, or otherwise. After user 8 provides the authentication credentials, VPN manager 34 may instruct operating system 32 to transmit the authentication credentials to a network address of VPN gateway 14. VPN manager 34 may be pre-configured with the network address or hostname of VPN gateway 14. If VPN gateway 14 accepts the authentication credentials, VPN gateway 14 and client device 4 may negotiate security parameters to establish VPN connection 16. Furthermore, VPN gateway 14 may provide VPN manager 34 with application security information 36. Application security information 36 may include names or other identifiers (such as hash values of binary representations) of particular applications 30 whose network traffic client device 4 is to route through VPN connection 16.

After VPN manager 34 receives application security information 36, VPN manager 34 may configure an application traffic identifier (ATI) subsystem 38 in operating system 32. ATI subsystem 38 may represent a specialized kernel-mode network interface that is exposed at the upper edge of transport protocol stacks. For example, in the context of Microsoft Windows, ATI subsystem 38 may be a Transport Driver Interface (TDI) or a configuration of a Winsock Kernel. Because ATI subsystem 38 represents a network interface that is exposed at the upper edge of transport protocol stacks, ATI subsystem 38 may receive requests from applications 30 to perform transport layer services for application-layer data.

For example, ATI subsystem 38 may receive requests to establish transport-layer sessions, send data conforming to an application-layer protocol or upper-level protocol (e.g., a socket) using a transport-layer protocol, receive data conforming to an application-layer protocol, and so on. After receiving a request, ATI subsystem 38 may pass the request on to one of a set of transport-layer protocol modules 44 that perform the transport protocol stacks. Transport-layer protocol modules 44 may include a TCP module, a User Datagram Protocol module, an AppleTalk module, or otherwise.

When ATI subsystem 38 receives a request from one of applications 30 to establish a transport-layer connection to a device associated with a specified network address, ATI subsystem 38 determines whether the requesting application is one of the applications specified by application security information 36. In some embodiments, ATI subsystem 38 may determine that the requesting application is one of the applications specified by application security information 36 by calculating a hash value for a binary representation of the application on client device 4. When the hash value matches a hash value in application security information 36, ATI subsystem 38 determines that the request is from an application specified by application security information 36. If the requesting application is one of the applications specified by application security information 36, ATI subsystem 38 creates an entry in an application security table 42. The entry may contain the specified network address and a transport-layer protocol port number.

Transport-layer modules 44 may send requests for network-layer services to a network-layer VPN subsystem 40. For example, transport-layer modules 44 may send requests to VPN subsystem 40 to send transport-layer segments (e.g., TCP segments) to a specified network-protocol address. VPN subsystem 40 may be viewed as operating within Layer 3 of the network stack and is generally unaware of application-layer data. When VPN subsystem 40 receives a request to send a transport-layer segment to a specified network-protocol address, VPN subsystem 40 may extract a source port number from the transport-protocol segment. VPN subsystem 40 may then determine whether application security table 42 contains an entry that corresponds to the specified network-protocol address and the extracted source port. For example, VPN subsystem 40 may scan through application security table 42 and attempt to find an entry that includes a network-protocol address and a port number that match the specified network-protocol address and extracted source port. In this manner, application security table may be viewed as a network layer (Layer 3) data structure that ATI subsystem 38 updates so as to provide information for a transport layer connection for use by a Layer 3 VPN subsystem 40.

If VPN subsystem 40 identifies an entry in application security table 42 that corresponds to the specified network-protocol address and the extracted source port, VPN subsystem 40 may encapsulate the transport-layer segments within network-layer protocol packets (e.g., IP packets). VPN subsystem 40 may specify a network address of a physical adapter 46 of client device 4 as a source address of the network-layer protocol packet. Physical adapter 46 may be a network interface card, or otherwise. VPN subsystem 40 may specify a network address associated with server device 6 as a destination address of the network-layer protocol packet. In some embodiments, VPN subsystem 40 may receive Network Address Translation (NAT) information from VPN gateway 14. VPN subsystem 40 may use this NAT information to translate the network address associated with server device 6 into a network address associated with a physical adapter of server device 6.

After VPN subsystem 40 encapsulates the transport-layer segment within a network-layer protocol packet, VPN subsystem 40 may encapsulate the network-layer protocol packet to create a secured network-layer protocol packet. For example, VPN subsystem 40 may encrypt the network-layer protocol packet and then encapsulate the encrypted network-layer protocol packet within an ESP packet. VPN subsystem 40 may specify a network address of VPN gateway 14 as a destination address of the secured network-layer protocol packet. VPN subsystem 40 may specify a network address of physical adapter 46 as a source address of the secured network-layer protocol packet. VPN subsystem 40 may then send a request to a data link-layer module 48 to send the secured network-layer protocol packet. In this way, VPN subsystem 40 may send network traffic through VPN connection 16.

On the other hand, if VPN subsystem 40 does not identify an entry in application security table 42 that corresponds to the specified network-protocol address and the extracted source port of the transport-layer segment, VPN subsystem 40 outputs the data in an unsecure (i.e., unencrypted) format. In other words, VPN subsystem 40 does not send the network-layer packet through VPN connection 16.

Figure 3:
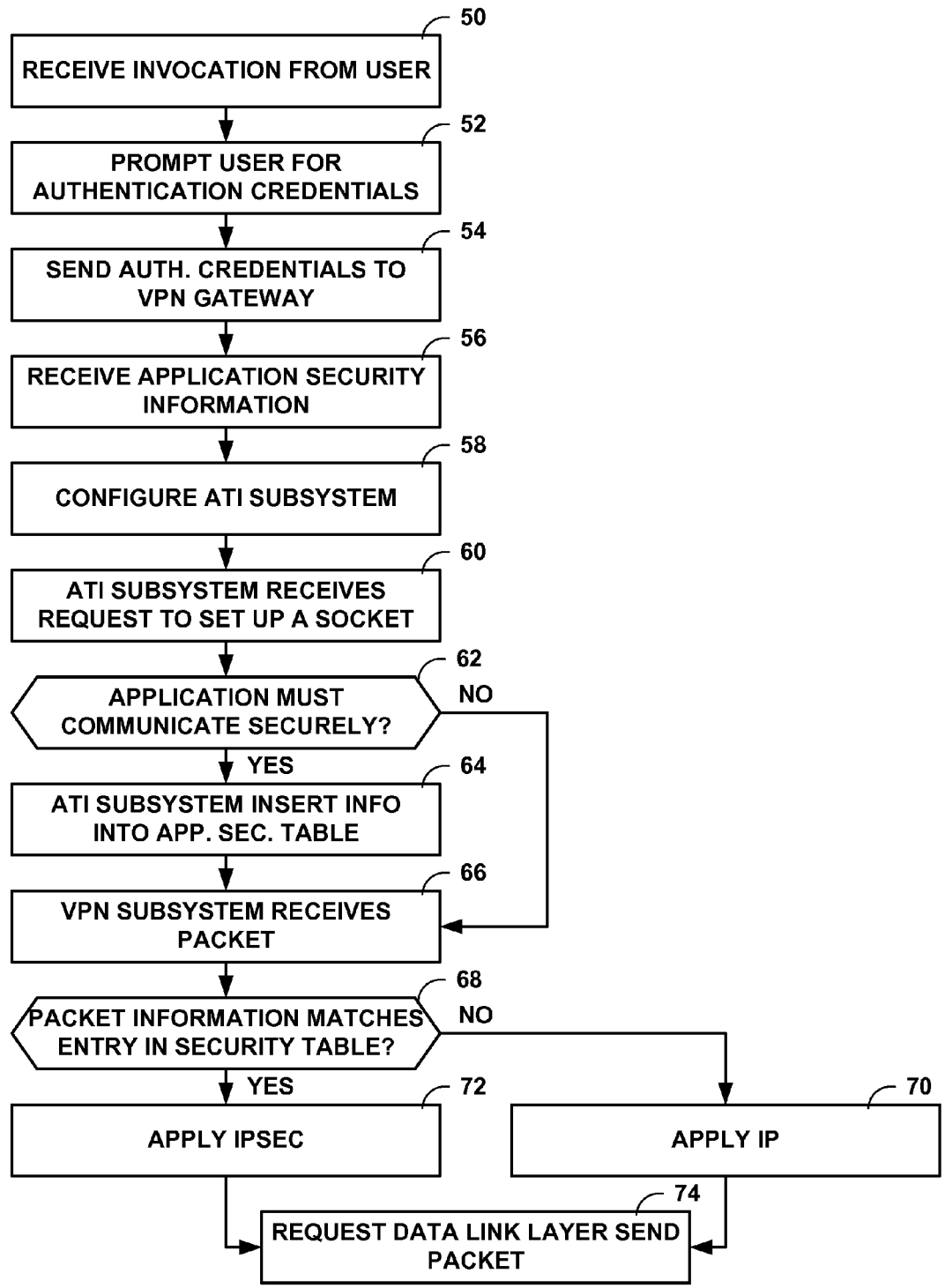
FIG. 3 is a flowchart illustrating an exemplary operation of a client device that provides an application-specific network-layer VPN tunnel.

FIG. 3 is a flowchart illustrating an exemplary operation of client device 4 that provides an application-specific network-layer VPN connection. Initially, user 8 provides input that directs operating system 32 of client device 4 to launch VPN manager 34 (50). After operating system 32 launches VPN manager 34, VPN manager 34 prompts user 8 for authentication credentials (52). Subsequently, VPN manager 34 may send the authentication credentials to VPN gateway 14 (54). If VPN gateway 14 accepts the authentication credentials, VPN gateway 14 may send application security information 36 to VPN manager 34 (56). After VPN manager 34 receives application security information 36 from VPN gateway 14, VPN manager 34 may install ATI subsystem 38 as a hook within operating system 32, and configure ATI subsystem 38 in operating system 32 to specify the particular applications 30 for which traffic is to be securely routed through the VPN connection (58).

Once VPN manager 34 configures ATI subsystem 38, ATI subsystem 38 may intercept an operating system call from one of applications 30, where the intercepted call represents an application-layer request to create an Internet socket for communication with network server 6 in a particular protocol (60). ATI subsystem 38 may then use application security information 36 to determine whether application security information 36 requires client device 4 to send network traffic from the requesting application through VPN connection 16 (62). For example, as a hook within the exposed interface of the operating system, ATI subsystem 38 may determine that a name of the calling application may match a name of an application listed in application security information 36. If ATI subsystem 38 determines that application security information 36 requires client device 4 to send network traffic from the requesting application through VPN connection 16 ("YES" of 62), ATI subsystem 38 inserts a destination IP address and port number of the requested Internet socket as an entry in application security table 42 (64). If ATI subsystem 38 determines that application security information 38 does not require client device 4 to send network traffic from the requesting application through VPN connection 16 ("NO" of 62), ATI subsystem 38 does not insert the destination IP address and port number into application security table 42.

Subsequently, VPN subsystem 40 may receive a request from one of transport protocol modules 44 to send application-layer data as transport protocol segments (66). When VPN subsystem 40, which operates at the transport level (i.e., Layer 3), prepares to send a transport protocol segment, VPN subsystem 40 determines whether application security table 42 contains an entry that matches the destination address and port number of the request received from the transport protocol module (68).

If application security table 42 does not contain an entry with the destination address and port number of the request ("NO" of 68), VPN subsystem 40 may encapsulate the transport-layer protocol segment in a standard IP header to create an IP packet (70). After VPN subsystem 40 has created the IP packet, VPN subsystem 40 may request data link-layer module 48 send the unencrypted IP packet (74).

On the other hand, if application security table 42 contains an entry with the destination address and port number of the request ("YES" of 68), VPN subsystem 40 may apply IPsec to the transport-layer protocol segment to create an IPsec packet (72). After VPN subsystem 40 has created the IPsec packet, VPN subsystem 40 may request data link-layer module 48 to send the IPsec packet (74). Other forms of encryption and security may be used via Layer 3 VPN subsystem 40.

Various embodiments of the invention have been described. These and other embodiments are within the scope of the following claims.

The invention claimed is:

1. A method comprising:
    establishing a network-layer (Layer 3) virtual private network (VPN) tunnel from a client device to a gateway device, wherein the network-layer VPN tunnel is defined by a network address of an adapter of the client device and a network address of the gateway device;
    receiving, with a module on a client device, application-layer data to be sent to a server device from an application executing on the client device;
    before forming one or more network-layer packets including the received application-layer data, determining, with the module, on an application-by-application basis based on the application from which the application-layer data was received, whether to send the application-layer data through the network-layer VPN tunnel; and
    sending, with the client device, the one or more network-layer packets including the application-layer data through the network-layer VPN tunnel based on the determination.

2. The method of claim 1, wherein the method further comprises receiving application security information that identifies the application and specifies that the client device should route network traffic from the application through the VPN tunnel.

3. The method of claim 2, wherein determining whether to route network traffic comprises:
    intercepting, with the module, a request from the application to an operating system, wherein the request is a request to establish a transport-layer connection;
    determining whether the application security information specifies that application-layer data from the particular application is to be routed through the VPN tunnel; and
    updating a network layer (Layer 3) data structure with the module to provide information for a transport layer connection for use by a Layer 3 VPN module when subsequently sending the application-layer data as network layer data.

4. The method of claim 3, wherein intercepting a request comprises receiving a request with a transport driver interface (TDI).

5. The method of claim 3, wherein intercepting a request comprises intercepting a request to create a network socket.

6. The method of claim 3,
wherein receiving application security information comprises receiving a set of hash values calculated from binary representations of applications; and
wherein determining whether the application security information specifies that the client device should route network traffic comprises:
calculating a hash value from a binary representation of the application that originated the request; and
determining whether the hash values calculated from the binary representation of the application that originated the request matches one of the hash values in the application security information.

7. The method of claim 3, wherein determining whether to send application-layer data comprises:
receiving, with the VPN module, a request to send a transport-layer segment from the application using a network-layer protocol;
determining whether transport-layer information of the transport-layer segment corresponds to the transport-layer information provided to the VPN module; and
generating a network-layer packet for the transport-layer segment.

8. A method comprising:
establishing a network-layer (Layer 3) virtual private network (VPN) tunnel from a client device to a gateway device, wherein the network-layer VPN tunnel is defined by a network address of an adapter of the client device and a network address of the gateway device;
receiving application security information that identifies an application executing on the client device and specifies that the client device should route network traffic from the application through the VPN tunnel;
receiving, with a module on the client device, application-layer data to be sent to a server device from an application executing on the client device;
determining, on an application-by-application basis based on the application from which the application-layer data was received, whether to send the application-layer data through the network-layer VPN tunnel, comprising:
intercepting, with the module, a request from the application to an operating system, wherein the request is a request to establish a transport-layer connection;
determining whether the application security information specifies that application-layer data from the particular application is to be routed through the VPN tunnel; and
updating a network layer (Layer 3) data structure with the module to provide information for a transport layer connection for use by a Layer 3 VPN module when subsequently sending the application-layer data as network layer data;
receiving, with the VPN module, a request to send a transport-layer segment from the application using a network-layer protocol;
determining whether transport-layer information of the transport-layer segment corresponds to the transport-layer information provided to the VPN module; and
generating a network-layer packet for the transport-layer segment, comprising:
encapsulating the transport-layer segment within a network-layer packet; and
encapsulating the network-layer packet within a secure network-layer packet having the address of the gateway device as a destination address; and
sending, with the client device, the application-layer data through the network-layer VPN tunnel based on the determination of whether to send the application-layer data through the network-layer VPN tunnel.

9. The method of claim 8, wherein the gateway device performs a network address translation on a destination network address of the network-layer packet.

10. The method of claim 8, wherein the client device performs a network address translation on a destination network address of the network-layer packet.

11. The method of claim 1, further comprising receiving, with the client device, network traffic through the VPN tunnel in a network connection initiated by the server device.

12. The method of claim 11, wherein receiving network traffic through the VPN tunnel in a network connection initiated by a server comprises receiving an invitation from the server to establish one of: a File Transfer Protocol session, a Voice over Internet Protocol session, and a Session Initiation Protocol session.

13. The method of claim 1, wherein sending the application-layer data comprises sending the application-layer data originating from the application through an Internet Protocol Security (IPsec) tunnel.

14. A network device comprising:
a VPN manager to establish a network-layer VPN tunnel from the network device to a gateway device, wherein the network-layer VPN tunnel is defined by a network address of an adapter of the network device and a network address of the gateway device;
an Application Traffic Identifier (ATI) subsystem to intercept application-layer data to be sent to a server device from an application executing on the network device, wherein the ATI subsystem determines, before forming one or more network-layer packets including the received application-layer data, on an application-by-application basis whether to send the application-layer data through the network-layer VPN tunnel; and
a Layer 3 VPN subsystem responsive to the ATI subsystem, wherein the Layer 3 VPN subsystem sends the one or more network-layer packets including the application-layer data through the network-layer VPN tunnel based on the determination.

15. The network device of claim 14,
wherein the VPN manager receives application security information from a VPN gateway, and
wherein the application security information identifies the application and specifies that the network device should route the application-layer data from the application through VPN tunnel.

16. The network device of claim 15,
further comprising a table accessible by both the ATI subsystem and the Layer 3 VPN subsystem, wherein the table includes entries for entry for network addresses and transport-layer protocol port numbers for transport connections that are to be securely directed through the VPN tunnel,
wherein the ATI subsystem intercepts a request from the application to establish a transport-layer connection, determines whether the application security information specifies that application-layer data from the application is to be directed through the VPN tunnel, and updates the table to provide the network address and the port number for a transport layer connection for use by a Layer 3 VPN module when subsequently sending the application-layer data as network layer data.

17. The network device of claim 16,
wherein the ATI subsystem comprises a hook installed within an operating system of the network device, wherein the ATI subsystem provides a kernel-mode network interface that is exposed at an upper edge of transport protocol stacks provided by the operating system.

18. The network device of claim 16, wherein the ATI subsystem intercepts a request from the application by intercepting a request to create a network socket.

19. The network device of claim 16,
wherein the application security information comprises a set of hash values calculated from binary representations of applications; and
wherein the ATI subsystem determines whether the application security information specifies that the client device should route network traffic from the application through the VPN tunnel by calculating a hash value from a binary representation of the application and determining whether the hash values calculated from the binary representation of the application that originated the request matches one of the hash values in the application security information.

20. The network device of claim 16, wherein the VPN module sends the application-layer data through the VPN tunnel based on the determination by receiving a request to send a transport-layer segment from the application from the application using a network-layer protocol, determining whether transport-layer information of the transport-layer segment corresponds to the transport-layer information provided to the VPN module by the ATI subsystem, and generating a network-layer packet for the transport-layer segment.

21. The network device of claim 20, wherein the VPN module generates a network-layer packet by encapsulating the transport-layer segment within a network-layer packet and encapsulating the network-layer packet within a secure network-layer packet having the address of the gateway device as a destination address.

22. The network device of claim 21, wherein the gateway device performs a network address translation on a destination network address of the network-layer packet.

23. The network device of claim 21, wherein the client device performs a network address translation on a destination network address of the network-layer packet.

24. The network device of claim 14, wherein the network device receives network traffic through the VPN tunnel in a network connection initiated by the server device.

25. A non-transitory computer-readable storage medium comprising instructions, the instructions causing a programmable processor of a client device to:
establish a network-layer virtual private network (VPN) tunnel from the client device to a gateway device, wherein the network-layer VPN tunnel is defined by a network address of an adapter of the client device and a network address of the gateway device;
receive, with a module on the client device, network traffic to a server device from an application executing on the client device;
before forming one or more network-layer packets including the received application-layer data, determine, with the module, whether to send the application-layer data through the network-layer VPN tunnel on an application-by-application basis; and
send the one or more network-layer packets including the application-layer data through the network-layer VPN tunnel based on the determination.

26. The method of claim 1, further comprising forming the one or more network-layer packets including the received application-layer data upon determining that the application-layer data is to be sent through the network-layer VPN tunnel by encrypting the application-layer data and encapsulating the encrypted application-layer data to form the one or more network-layer packets.

* * * * *